(12) United States Patent
Kim et al.

(10) Patent No.: US 9,312,574 B2
(45) Date of Patent: Apr. 12, 2016

(54) BATTERY MODULE INCLUDING LED ELEMENT ON PCB

(71) Applicant: LG CHEM, LTD., Seoul (KR)

(72) Inventors: Juhan Kim, Daejeon (KR); Jun Yeob Seong, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/419,302

(22) PCT Filed: Oct. 25, 2013

(86) PCT No.: PCT/KR2013/009562
§ 371 (c)(1),
(2) Date: Feb. 3, 2015

(87) PCT Pub. No.: WO2014/069842
PCT Pub. Date: May 8, 2014

(65) Prior Publication Data
US 2015/0229007 A1    Aug. 13, 2015

(30) Foreign Application Priority Data
Oct. 29, 2012 (KR) .................. 10-2012-0120085

(51) Int. Cl.
| | |
|---|---|
| *H01M 10/42* | (2006.01) |
| *H01M 10/48* | (2006.01) |
| *H01M 2/02* | (2006.01) |
| *H01M 10/052* | (2010.01) |

(52) U.S. Cl.
CPC ........ *H01M 10/4257* (2013.01); *H01M 10/425* (2013.01); *H01M 10/488* (2013.01); *H01M 2/0217* (2013.01); *H01M 10/052* (2013.01); *H01M 10/486* (2013.01); *H01M 2200/10* (2013.01); *H01M 2220/20* (2013.01); *H01M 2220/30* (2013.01)

(58) Field of Classification Search
CPC ................... H01M 10/4257; H01M 10/488
See application file for complete search history.

(56) References Cited

U.S. PATENT DOCUMENTS

| | | |
|---|---|---|
| 6,805,997 B1 | 10/2004 | Katayama |
| 2009/0123817 A1 | 5/2009 | Stickel et al. |
| 2010/0090847 A1 | 4/2010 | Hendren et al. |

(Continued)

FOREIGN PATENT DOCUMENTS

| | | |
|---|---|---|
| GB | 2302202 A | 1/1997 |
| JP | 11-233163 A | 8/1999 |

(Continued)

OTHER PUBLICATIONS

International Search Report, issued in PCT/KR2013/009562, dated Feb. 21, 2014.

*Primary Examiner* — Stewart Fraser
(74) *Attorney, Agent, or Firm* — Birch, Stewart, Kolasch & Birch, LLP (57) ABSTRACT

Disclosed is a battery module including an LED element on a PCB. More particularly, the battery module including at least two battery cells includes a protective circuit board installed at a side surface of the battery module and electrically connected to the battery module, at least one LED element installed on the protective circuit board and displaying changes in operating states of the battery cells, a cover plate provided with a window for light transmission of the LED element and installed at a side surface of the battery module so as to surround the protective circuit board, and a light-transmissive LED cover installed at an inner side of the cover plate to correspond to the window of the cover plate in order to emit light emitted from the LED element.

16 Claims, 4 Drawing Sheets

(56) References Cited

U.S. PATENT DOCUMENTS

| | | |
|---|---|---|
| 2010/0310915 A1 | 12/2010 | Satake et al. |
| 2012/0121953 A1 | 5/2012 | Baek |
| 2012/0214026 A1 | 8/2012 | Moon et al. |

FOREIGN PATENT DOCUMENTS

| | | |
|---|---|---|
| JP | 2007-294171 A | 11/2007 |
| JP | 2009-59720 A | 3/2009 |
| KR | 10-2012-0094705 A | 8/2012 |
| TW | M279027 U | 10/2005 |
| TW | M420050 U | 1/2012 |

BATTERY MODULE INCLUDING LED ELEMENT ON PCB

TECHNICAL FIELD

The present invention relates to a battery module including an LED element on a PCB. More specifically, the present invention relates to a battery module including at least two battery cells, including: a protective circuit board provided at a side surface of the battery module to be electrically connected thereto; at least one LED element installed on the protective circuit board and displaying changes in operating states of the battery cells; a cover plate provided with a window for light transmission of the LED element and provided at a side surface of the battery module so as to surround the protective circuit board; and a light-transmissive LED cover installed at an inner side of the cover plate to correspond to the window of the cover plate in order to emit light emitted from the LED element.

BACKGROUND ART

Among secondary batteries, which have recently been increasingly used, demand for rectangular secondary batteries that may be applied to products such as mobile phones and the like due to their small thickness in terms of battery shape is high, and demand for lithium secondary batteries, such as lithium ion batteries, lithium ion polymer batteries, and the like, with high energy density, high discharge voltage, high power output stability, and the like in terms of materials constituting the batteries is high.

Secondary batteries are largely classified into cylindrical batteries, rectangular batteries, and pouch type batteries according to external and internal structural characteristics. Among these, in particular, rectangular batteries and pouch type batteries that may be stacked with a high degree of integration and have a relatively low width to length ratio are receiving attention.

In addition, secondary batteries are also receiving attention as energy sources of electric vehicles, hybrid electric vehicles, and the like, which are alternatives to address air pollution and the like of existing gasoline vehicles, diesel vehicles and the like that use fossil fuels. Thus, applications using secondary batteries are increasingly diversified due to advantages of secondary batteries and application of secondary batteries to more fields and products is anticipated in the future.

As such, as application fields and products of secondary batteries are diversified, batteries are also diversified so as to provide power output and capacity corresponding thereto. In addition, batteries applied to the fields and products strongly require small sizes and lightweight.

For example, small mobile devices such as mobile phones, PDAs, digital cameras, notebook computers, and the like use one to three small and lightweight battery cells per device so as to correspond to the trend of smaller size and lighter weight. By contrast, medium to large-scale devices such as electric vehicles, hybrid electric vehicles and the like use a battery module (also referred to as a "medium to large-scale battery pack") in which a plurality of battery cells are electrically connected, due to requirements of high power output and high capacity. In this regard, the size and weight of a battery module is directly related to accommodation space, power output, and the like of medium to large-scale devices and thus manufacturers have put much effort into manufacturing relatively small and lightweight battery modules.

A battery module includes a plurality of battery cells and thus an operating state of each battery cell needs to be checked and controlled. For example, it is necessary to secure optimum operating state and safety by detecting physical operating states such as voltage, temperature and the like of each battery cell. Checking of such physical operating states is implemented by a configuration in which a connection member such as wires or the like for measuring voltage is connected to a control unit of each battery cell, which is an object to be measured, or a configuration in which a temperature sensor is installed at an outer surface or in the vicinity of each battery cell, which is an object to be measured, and a detection signal thereof is connected to a control unit of each battery cell using a connection member.

Meanwhile, when a lithium secondary battery is used as a unit cell of a battery module, battery module safety needs to be more carefully considered. Lithium secondary batteries undergo relatively large changes in volume at an anode during intercalation/deintercalation processes. That is, lithium secondary batteries repeatedly expand and contract during repeated charging and discharging and thus internal resistance is increased through such expansion and contraction, which results in significantly reduced battery performance. In addition, a battery case is separated due to gases generated by decomposition of an electrolyte and thus the electrolyte leaks out and fires or explosion may eventually occur. Moreover, combustion or explosion caused in some of the battery cells is continuously transferred to the other battery cells, which may cause severe conditions.

Thus, in consideration of these problems, it may be necessary to check an operating state of each unit cell of a medium to large-scale battery module using a lithium secondary battery as a unit cell, and some related arts disclose a technology of using an LED element as a display unit to display changes in such operating states.

When an LED element is used to display changes in operating states of battery cells, however, a cover of an optical display unit causes optical loss, and light diffusion is not easy due to light straightness of an LED and thus light emitted from the LED element is difficult on the eyes. In addition, when treating an LED element with a separate diffuser film or exposing an LED element by fabrication into a separate lamp, in order for light diffusion of the LED element, additional manufacturing processes are needed, a greater number of components is used, and exterior appearance thereof is not beautiful.

In addition, there is a high need to manufacture a compact, highly structurally stable battery module by considering structural characteristics of a device provided with a battery module installed.

Therefore, there is a very high need to develop technologies that may address these problems and meet such needs.

DISCLOSURE

Technical Problem

Therefore, the present invention has been made to solve the above problems and other technical problems that have yet to be resolved.

That is, it is one object of the present invention to provide a battery module including a cover plate provided with a window for light transmission of an LED element and installed at a side surface of the battery module so as to surround a protective circuit board and a light-transmissive LED cover installed at an inner side of the cover plate to correspond to the window of the cover plate in order to emit light emitted from the LED element, whereby light emitted from the LED element is effectively diffused and thus is easy on the eyes, and a complete shielding function is obtained and thus direct generation of light from a PCB is possible.

It is another object of the present invention to provide a battery module manufactured using simplified manufacturing processes without additional manufacturing processes such as attachment of a diffuser film to an LED element or exposure of an LED element by fabrication into a separate lamp.

It is another object of the present invention to provide a battery module having high structural stability and a compact structure.

Technical Solution

In accordance with one aspect of the present invention, provided is a battery module including at least two battery cells, the battery module including: a protective circuit board installed at a side surface of the battery module and electrically connected to the battery module; at least one LED element installed on the protective circuit board and displaying changes in operating states of the battery cells; a cover plate provided with a window for light transmission of the LED element and installed at a side surface of the battery module so as to surround the protective circuit board; and a light-transmissive LED cover installed at an inner side of the cover plate to correspond to the window of the cover plate in order to emit light emitted from the LED element.

That is, the present invention provides a battery module including: a cover plate provided with a window for light transmission of an LED element and installed at a side surface of the battery module so as to surround a protective circuit board; and a light-transmissive LED cover installed at an inner side of the cover plate to correspond to the window of the cover plate in order to emit light emitted from the LED element, whereby light emitted from the LED element is effectively diffused and thus is easy on the eyes, and a complete shielding function is obtained and thus direct generation of light from a PCB is possible.

The battery cells according to the present invention may, for example, be plate type battery cells or a rectangular battery in which the battery cells are accommodated in a rectangular battery case. Such a rectangular battery may be manufactured by inserting the battery cells into a rectangular battery case, coupling a top cap provided with a protrusion-type anode terminal to an open top end of the battery case, and injecting an electrolyte through an electrolyte inlet formed at the top cap.

In addition, the battery cells may be applied to a secondary battery using a pouch-type battery case consisting of a laminate sheet including a resin layer and a metal layer.

The battery cells according to the present invention may be applied to a lithium ion secondary battery in which an electrode assembly is impregnated with a lithium-containing electrolyte, a lithium ion polymer battery in which an electrode assembly is impregnated with a gel-type lithium-containing electrolyte, and the like.

In general, a lithium secondary battery includes a cathode, an anode, a separator, and a lithium salt-containing non-aqueous electrolyte.

The cathode may be manufactured by, for example, coating a mixture of a cathode active material, a conductive agent, and a binder on a cathode current collector and drying the coated cathode current collector. The mixture may further include a filler as desired.

Examples of the cathode active material include, without being limited to, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$.

The conductive material is typically added in an amount of 1 to 30 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an electrode active material and the conductive material and in binding of the electrode active material to an electrode current collector. The binder is typically added in an amount of 1 to 30 wt % based on the total weight of the mixture including the cathode active material. Examples of the binder include, without being limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode may be manufactured by coating an anode active material on an anode current collector and drying the coated anode current collector. In some cases, the above-described components may be further coated on the anode current collector.

Examples of the anode active material include, without being limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0<x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The separator is disposed between the cathode and the anode and, as the separator, a thin insulating film with high ion permeability and high mechanical strength is used. The separator generally has a pore diameter of 0.01 to 10 μm and a thickness of 5 to 300 μM. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a polar organic electrolyte and a lithium salt. The electrolyte may be a non-aqueous liquid electrolyte, an organic solid electrolyte, an inorganic solid electrolyte, or the like.

Examples of the non-aqueous liquid electrolyte include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, without being limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, without being limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may further include carbon dioxide gas.

Meanwhile, the LED element installed on the protective circuit board displays changes in operating states of the battery cells and, in particular, the operating states may be at least one selected from the group consisting of charge and discharge states of the battery cells, abnormal operating states according to change in temperature of the battery cells or change in volume of the battery cells, and capacity of the battery cells.

While an existing LED element has problems in that a cover of a light display unit causes optical loss and light emitted from the LED element is not easily diffused due to light straightness of an LED and thus is difficult on the eyes, the LED cover according to the present invention may address the above-described problems because the LED cover includes a light guide plate for transmitting light in a diffuse reflection manner.

The light guide plate is not particularly limited so long as it has a general structure in which irregularities are repeated, in order to induce diffuse reflection. In a specific embodiment, the light guide plate may have an uneven surface so as for transmitted light to be refracted and scattered and may be formed of an optically transmissive plastic material.

Thus, since the battery module according to the present invention includes the light-transmissive LED cover, light emitted from the LED element is scattered and diffused while passing through the light-transmissive LED cover and, accordingly, may be easy on the eyes.

In addition, in the battery module according to the present invention, the cover plate is installed at a side surface of the battery module so as to completely surround the protective circuit board to provide a complete shielding function.

In a specific embodiment, the cover plate may include a coupling part provided at an inner center thereof so as to simultaneously fix the protective circuit board and the LED cover.

Thus, the protective circuit board may be securely fixed at the inner center of the cover plate and may also emit light from the LED element to the outside via the window for light transmission formed on the cover plate.

In addition, the cover plate may further be provided at an outer surface thereof with an exterior cover. The exterior cover may form an exterior appearance of the battery module and provide a complete shielding function.

In another specific embodiment, the battery module may include a base plate including accommodation parts provided on upper surfaces thereof with battery cells mounted in a state in which electrode terminals are arranged in a side direction and provided at peripheries thereof with upwardly bent sidewalls, and an upper cover plate provided at opposite sides thereof with downwardly bent sidewalls based on the electrode terminals of the battery cells and fixed to an upper surface of the base plate to form an upper surface of the battery module.

The base plate and the upper cover plate may be fixed to each other via a bracket.

In particular, the bracket may have a first side fixedly installed at a sidewall of the base plate by, preferably, welding and a second side coupled to a sidewall of the upper cover plate by fastening.

The fastening between the bracket and the upper cover plate may be implemented using elastic deformation of the upper cover plate, for example, by forming a protrusion portion at a sidewall of the upper cover plate, forming a recessed portion having a size corresponding to that of the protrusion portion at a sidewall of the bracket, and coupling the protrusion portion to the recessed portion.

The protrusion portion and the recessed portion may include a fastening hole at corresponding positions and fixed to each other by fastening using a fastening member via the fastening holes.

Thus, the upper cover plate may be easily coupled to the bracket due to elasticity thereof and, accordingly, coupling assembly processes may be more easily implemented and the upper cover plate may be solidly and stably fixed to the cover plate fixed together with the protective circuit board and the LED cover.

The present invention provides a battery pack including the battery module and a device including the battery pack as a power source.

The battery module according to the present invention has a very compact structure with high structural stability. Thus, the battery pack including such a battery module may be applied to various devices which require small installation space and safety against external force.

Examples of the devices include, without being limited to, power tools; electric vehicles (EVs), hybrid EVs (HEVs), and plug-in HEVs (PHEVs); E-bikes; E-scooters; electric golf carts; and devices for storing power.

Effects of Invention

As is apparent from the fore-going, a battery module according to the present invention includes an LED element, light of which is effectively diffused and thus is easy on the eyes, has a complete shielding function and thus direct generation of light from a PCB is possible, and has a compact structure with high structural stability.

BRIEF DESCRIPTION OF THE DRAWINGS

The above and other objects, features and other advantages of the present invention will be more clearly understood from the following detailed description taken in conjunction with the accompanying drawing, in which.

BEST MODE

Now, the present invention will be described in more detail with reference to the following examples. These examples are provided only for illustration of the present invention and should not be construed as limiting the scope and spirit of the present invention.

Figure 1:
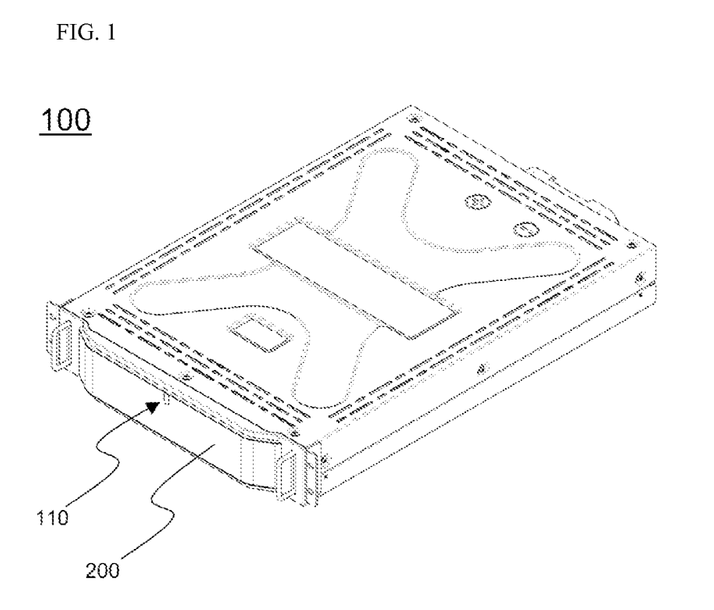
FIG. 1 is a view of a battery module according to an embodiment of the present invention.
Figure 2:
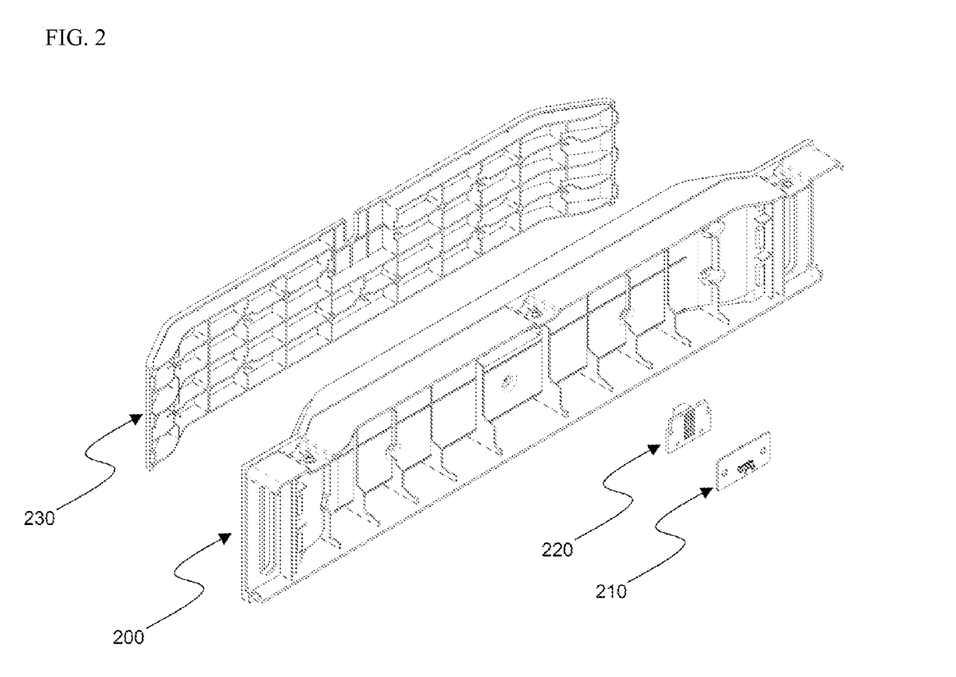
FIG. 2 is an exploded perspective view of a cover plate coupled to a side surface of the battery module of FIG. 1.

FIG. 1 is a view of a battery module 100 according to an embodiment of the present invention. FIG. 2 is an exploded perspective view of a cover plate coupled to a side surface of the battery module 100 of FIG. 1.

Referring to FIGS. 1 and 2, the battery module 100 includes a protective circuit board 210 installed at a side surface of the battery module 100 and electrically connected to the battery module 100, an LED element (not shown) installed on the protective circuit board 210 and displaying changes in operating states of battery cells, a cover plate 200 provided with a window 110 for transmission of light emitted from the LED element and installed at a side surface of the battery module 100 so as to completely surround the protective circuit board 210, and a light-transmissive LED cover 220 installed at an inner side of the cover plate 200 to correspond to the window 110 of the cover plate 200 in order to emit light emitted from the LED element. The cover plate 200 is provided at an outer surface thereof with an exterior cover 230.

Figure 3:
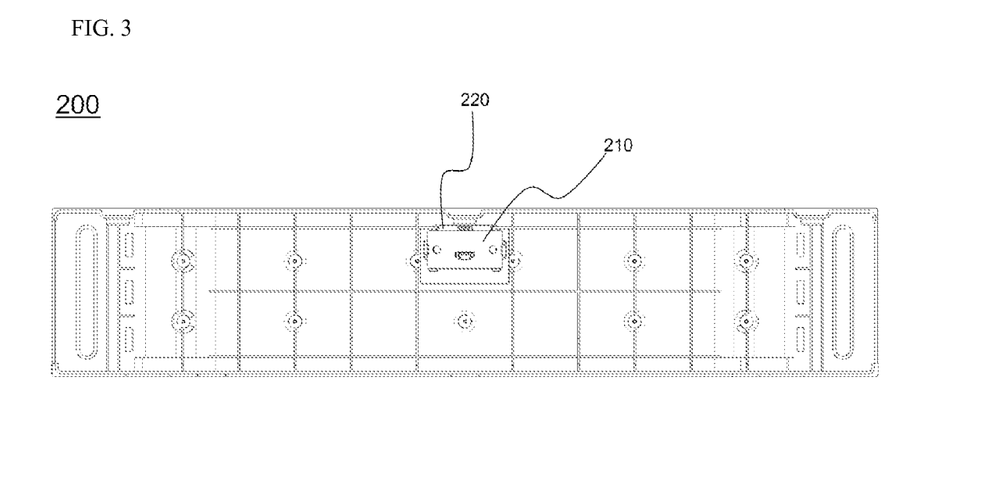
FIG. 3 is a view of a cover plate according to an embodiment of the present invention.

FIG. 3 is a view of the cover plate 200 according to an embodiment of the present invention.

Referring to FIG. 3, the cover plate 200 is provided at an inner center thereof with a coupling part so as to simultaneously fix the protective circuit board 210 and the LED cover 220 and thus the protective circuit board 210 and the LED cover 220 are simultaneously fixed. The fixed protective circuit board 210 and the LED cover 220 may be prevented from escape to the outside, rotation, or the like due to external impact or internal deformation of the battery cells and thus efficiency enhancement effects may be achieved in assembly.

Figure 4:
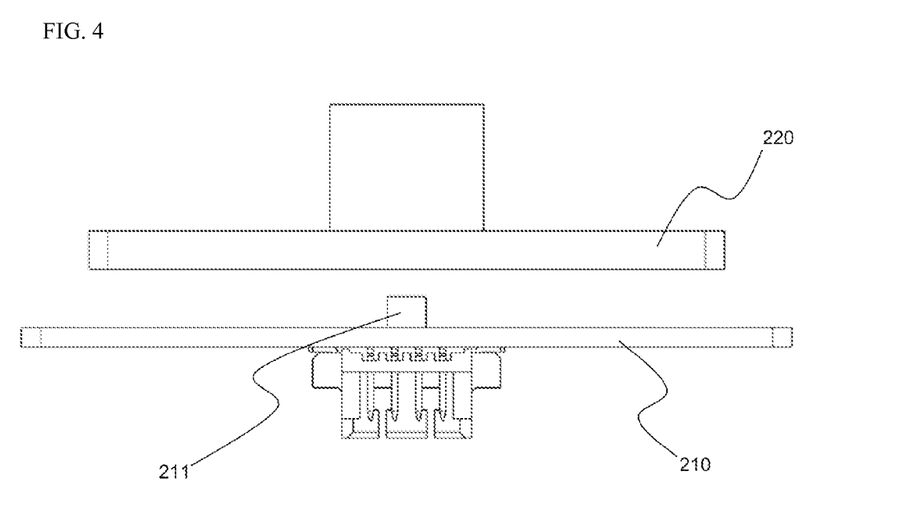
FIG. 4 is a sectional view of an LED cover and a protective circuit board, according to an embodiment of the present invention.
Figure 5:
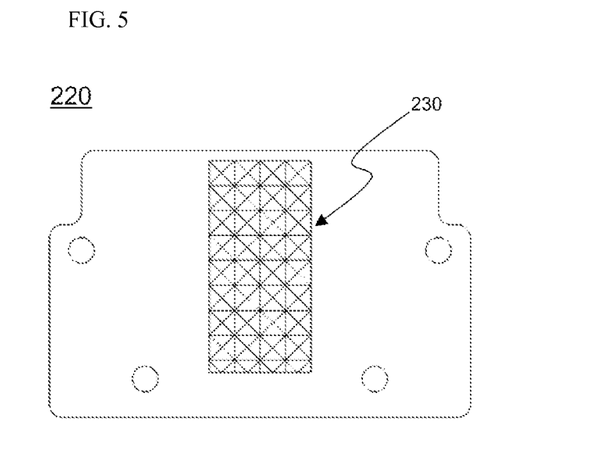
FIG. 5 is a plan view of an LED cover according to an embodiment of the present invention.

FIG. 4 is a sectional view of the LED cover 220 and the protective circuit board 210, according to an embodiment of the present invention. FIG. 5 is a plan view of the LED cover 220 according to an embodiment of the present invention.

Referring to FIG. 4, the LED element 211 for displaying changes in operating states of the battery cells is mounted on the protective circuit board 210 and displays information such as charge and discharge states of the battery cells, abnormal operating states according to changes in temperature of the battery cells or changes in volume of the battery cells, capacity of the battery cells, and the like.

As described above, the LED element 211 undergoes optical loss due to the window 110 of the cover plate 200, and light emitted from the LED element 211 is not easily diffused due to light straightness of an LED and thus is difficult on the eyes. To address these problems, the light-transmissive LED cover 220 to emit light emitted from the LED element 211 is installed.

Referring to FIG. 5, the LED cover 220 includes a light guide plate 230 for transmitting light in a diffuse reflection manner, and the light guide plate 230 has an uneven surface so as for transmitted light to be refracted and scattered and is made of an optically transmissive plastic material.

The uneven surface enables light emitted from the LED element 211 to be scattered and diffused while passing through the light guide plate 230 having an uneven surface and thus the light emitted from the LED element 211 may be easy on the eyes.

Figure 6:
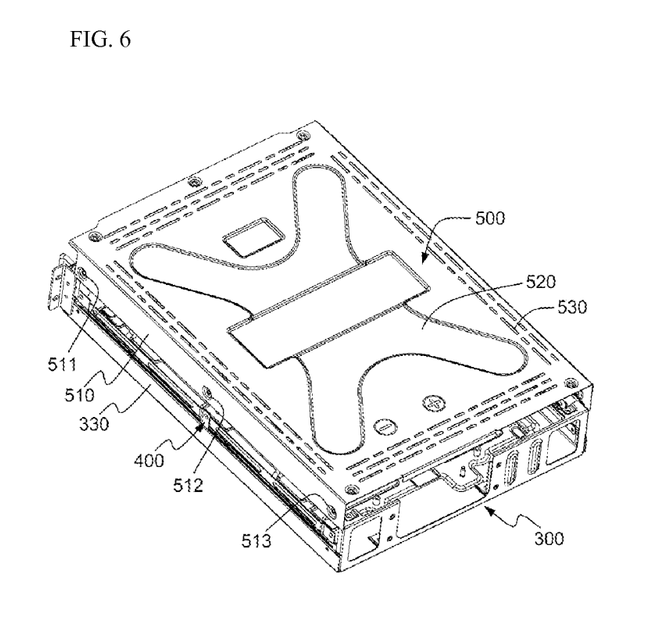
FIG. 6 is a perspective view of a battery module according to another embodiment of the present invention.

FIG. 6 is a perspective view of a battery module according to another embodiment of the present invention.

Referring to FIG. 6, an upper cover plate 500 includes downwardly bent sidewalls 510 and is coupled to a base plate 300 by a bracket 400 installed at the base plate 300.

In particular, the upper cover plate 500 includes protrusion portions 511, 512 and 513 corresponding to recessed portions formed at the bracket 400. The protrusion portions 511, 512 and 513 include fastening holes (not shown) that may be respectively fastened with fastening holes of the recessed portions by bolts.

Coupling of the upper cover plate 500 to the bracket 400 by fastening uses elastic deformation of the upper cover plate 500 and thus enables the upper cover plate 500 to be easily situated at a right position of the bracket 400 by elasticity thereof. Accordingly, coupling assembly processes may be more easily implemented.

In addition, the upper cover plate 500 is provided at an outer surface thereof with a reinforcing bead 520 to enhance rigidity of the upper cover plate 500 and is provided with a plurality of ventilation holes 530 formed along edges of the upper cover plate 500.

As is apparent from the fore-going, a battery module according to the present invention includes the cover plate described above and thus coupling assembly processes may be more easily implemented and the cover plate may be rigidly and stably fixed together with a protective circuit board and an LED cover.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising at least two battery cells, the battery module comprising:
   a protective circuit board installed at a side surface of the battery module and electrically connected to the battery module;
   at least one LED element installed on the protective circuit board and displaying changes in operating states of the battery cells;
   a cover plate provided with a window for light transmission of the LED element and installed at a side surface of the battery module so as to surround the protective circuit board; and
   a light-transmissive LED cover installed at an inner side of the cover plate to correspond to the window of the cover plate in order to emit light emitted from the LED element.

2. The battery module according to claim 1, wherein the battery cells are plate type battery cells.

3. The battery module according to claim 2, wherein the plate type battery cells are rectangular secondary batteries or pouch type secondary batteries.

4. The battery module according to claim 1, wherein the battery cells are lithium secondary batteries.

5. The battery module according to claim 1, wherein the operating states comprise at least one selected from the group consisting of charge and discharge states of the battery cells, abnormal operating states according to change in temperature of the battery cells or change in volume of the battery cells, and capacity of the battery cells.

6. The battery module according to claim 1, wherein the LED cover comprises a light guide plate for transmitting light in a diffuse reflection manner.

7. The battery module according to claim 6, wherein the light guide plate has an uneven surface so as for transmitted light to be refracted and scattered.

8. The battery module according to claim 6, wherein the light guide plate comprises a light-transmissive plastic material.

9. The battery module according to claim 1, wherein the cover plate comprises a coupling part provided at an inner center thereof so as to simultaneously fix the protective circuit board and the LED cover.

10. The battery module according to claim 1, wherein the cover plate is further provided at an outer surface thereof with an exterior cover.

11. The battery module according to claim 1, wherein the battery module comprises: a base plate comprising accommodation parts provided on upper surfaces thereof with battery cells mounted in a state in which electrode terminals are arranged in a side direction and provided at peripheries thereof with upwardly bent sidewalls; and an upper cover plate provided at opposite sides thereof with downwardly bent sidewalls based on the electrode terminals of the battery cells and fixed to an upper surface of the base plate to form an upper surface of the battery module.

12. The battery module according to claim 11, wherein the base plate and the upper cover plate are fixed to each other via a bracket.

13. The battery module according to claim 12, wherein the bracket has a first side coupled to a sidewall of the base plate by welding and a second side coupled to a sidewall of the upper cover plate by fastening.

14. A battery pack comprising the battery module according to claim 1.

15. A device comprising the battery pack according to claim 14 as a power source.

16. The device according to claim 15, wherein the device is selected from the group consisting of power tools; electric vehicles (EVs), hybrid EVs (HEVs), and plug-in HEVs (PHEVs); E-bikes; E-scooters; electric golf carts; and systems for storing power.

* * * * *